US012289755B2

(12) United States Patent
Fu

(10) Patent No.: US 12,289,755 B2
(45) Date of Patent: Apr. 29, 2025

(54) METHOD FOR TRANSMITTING DATA, AND DEVICES

(71) Applicant: GUANGDONG OPPO MOBILE TELECOMMUNICATIONS CORP., LTD., Guangdong (CN)

(72) Inventor: Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 424 days.

(21) Appl. No.: 17/838,270

(22) Filed: Jun. 13, 2022

(65) Prior Publication Data

US 2022/0322377 A1 Oct. 6, 2022

Related U.S. Application Data

(63) Continuation of application No. PCT/CN2019/127105, filed on Dec. 20, 2019.

(51) Int. Cl.
*H04W 72/56* (2023.01)
*H04W 36/00* (2009.01)
(Continued)

(52) U.S. Cl.
CPC ...... *H04W 72/569* (2023.01); *H04W 36/0011* (2013.01); *H04W 36/185* (2023.05)

(58) Field of Classification Search
CPC . H04W 72/569; H04W 72/563; H04W 72/56; H04W 36/0011; H04W 36/185
See application file for complete search history.

(56) References Cited

U.S. PATENT DOCUMENTS

2012/0140708 A1 6/2012 Choudhury et al.
2014/0056278 A1 2/2014 Marinier et al.
(Continued)

FOREIGN PATENT DOCUMENTS

CN 108207032 6/2018
CN 108513735 9/2018
CN 109392169 2/2019

OTHER PUBLICATIONS

Qualcomm Incorporated, "Supporting per DRB DAPS HO configuration", 3GPP TSG-RAN WG2 Meeting #107bis R2-1912299, Oct. 14-18, 2019, pp. 1-4.
"Office Action of Europe Counterpart Application, Application No. 19956705.8", issued on May 17, 2023, p. 1-p. 7.
"International Search Report (Form PCT/ISA/210) of PCT/CN2019/127105", mailed on Aug. 31, 2020, with English translation thereof, pp. 1-4.

(Continued)

*Primary Examiner* — Kent Krueger
(74) *Attorney, Agent, or Firm* — Hodgson Russ LLP

(57) ABSTRACT

Provided are a method for transmitting data, and devices. A method for transmitting data can be provided for a terminal device in the process of maintaining communication between the terminal device and multiple devices. The method comprises: where there is data to be transmitted between the terminal device and a first device and between the terminal device and a second device, and/or an available resource between the terminal device and the first device conflicts with an available resource between the terminal device and the second device, the terminal device determining, according to first information, data for prioritized transmission or a resource for prioritized use; and the terminal device sending the data for prioritized transmission, or, the terminal device sending the data on the resource for prioritized use.

20 Claims, 3 Drawing Sheets

(51) Int. Cl.
   *H04W 36/18*     (2009.01)
   *H04W 72/566*    (2023.01)

(56) References Cited

U.S. PATENT DOCUMENTS

| | | | |
|---|---|---|---|
| 2017/0303180 | A1 | 10/2017 | Kapoulas et al. |
| 2018/0316395 | A1* | 11/2018 | Sundararajan ........ H04L 5/0053 |
| 2019/0246420 | A1* | 8/2019 | Park ...................... H04W 72/23 |
| 2020/0022035 | A1* | 1/2020 | Kadiri ............... H04W 36/0072 |
| 2020/0145280 | A1* | 5/2020 | Cirik ................... H04L 41/0668 |
| 2021/0084644 | A1* | 3/2021 | Bae ...................... H04B 7/0626 |
| 2022/0007385 | A1* | 1/2022 | Dudda ...................... H04L 1/08 |
| 2022/0053459 | A1* | 2/2022 | Shimezawa ....... H04W 72/1268 |
| 2022/0264410 | A1* | 8/2022 | Yao ................... H04L 27/26025 |

OTHER PUBLICATIONS

"Written Opinion of the International Searching Authority (Form PCT/ISA/237) of PCT/CN2019/127105", mailed on Aug. 31, 2020, with English translation thereof, pp. 1-6.

ZTE, "Discussion on NR Mobility Enhancements in Physical Layer", 3GPP TSG RAN WG1 Meeting #99 R1-1911975, Nov. 18-22, 2019, pp. 1-11.

Ericsson, "Remaining issues on UL-SL prioritization", 3GPP TSG-RAN WG2 #107bis R2-1913326, Oct. 14-18, 2019, pp. 1-3.

Huawei et al., "Discussion on Sidelink Configured Grant support", 3GPP TSG-RAN WG2 #108 R2-1915966, Nov. 18-22, 2019, pp. 1-4.

"Search Report of of counterpart Europe application No. 19956705.8", issued on Oct. 20, 2022, p. 1-p. 10.

\* cited by examiner

METHOD FOR TRANSMITTING DATA, AND DEVICES

CROSS-REFERENCE TO RELATED APPLICATION

This application is a continuation of international PCT application serial no. PCT/CN2019/127105, filed on Dec. 20, 2019. The entirety of the above-mentioned patent application is hereby incorporated by reference herein and made a part of this specification.

TECHNICAL FIELD

The disclosure relates to the field of communications, and more particularly to a method for transmitting data, and devices.

DESCRIPTION OF RELATED ART

With the development of technology, in some special scenarios, a terminal device may communicate with multiple devices at the same time. In the process of communicating with the devices, if the terminal device needs to send data to the devices at the same time, there is no clear method on how the terminal device should send the data.

SUMMARY

The disclosure provides a method for transmitting data, and devices, which can provide a method for transmitting data for a terminal device in a process of maintaining communication between the terminal device and multiple devices.

In a first aspect, a method for transmitting data is provided, which includes the following steps. In a case where there is data to be transmitted between a terminal device and a first device and between the terminal device and a second device and/or an available resource between the terminal device and the first device conflicts with an available resource between the terminal device and the second device, the terminal device determines data for prioritized transmission or a resource for prioritized use according to first information. The terminal device sends the data for prioritized transmission or the terminal device sends data on the resource for prioritized use.

In a second aspect, a method for transmitting data is provided, which includes the following steps. In a case where there is data to be transmitted between a terminal device and a first device and between the terminal device and a second device and/or an available resource between the terminal device and the first device conflicts with an available resource between the terminal device and the second device, a third device determines data for prioritized transmission or a resource for prioritized use according to first information.

In a third aspect, a terminal device is provided for executing the method in the first aspect or each implementation thereof.

Specifically, the terminal device includes a functional module for executing the method in the first aspect or each implementation thereof.

In a fourth aspect, a communication device is provided for executing the method in the second aspect or each implementation thereof.

Specifically, the communication device includes a functional module for executing the method in the second aspect or each implementation thereof.

In a fifth aspect, a terminal device is provided, which includes a processor and a memory. The memory is used to store a computer program, and the processor is used to call and run the computer program stored in the memory to execute the method in the first aspect or each implementation thereof.

In a sixth aspect, a communication device is provided, which includes a processor and a memory. The memory is used to store a computer program, and the processor is used to call and run the computer program stored in the memory to execute the method in the second aspect or each implementation thereof.

In a seventh aspect, an equipment is provided for implementing the method in any one of the first aspect to the second aspect or each implementation thereof.

Specifically, the equipment includes a processor for calling and running a computer program from the memory, so that a device installed with the equipment executes the method in any one of the first aspect to the second aspect or each implementation thereof.

In an eighth aspect, a computer-readable storage medium is provided for storing a computer program, and the computer program enables a computer to execute the method in any one of the first aspect to the second aspect or each implementation thereof.

In a ninth aspect, a computer program product is provided, which includes a computer program command, and the computer program command enables a computer to execute the method in any one of the first aspect to the second aspect or each implementation thereof.

In a tenth aspect, a computer program is provided. When the computer program is run on a computer, the computer executes the method in any one of the first aspect to the second aspect or each implementation thereof.

Based on the above technical solutions, the terminal device may determine the data for prioritized transmission or the resource for prioritized use based on the first information, so as to provide a method for prioritized transmission for the terminal device in the case where the data or the resources are conflicting, which is conducive to ensuring the transmission requirements of special services.

DETAILED DESCRIPTION OF DISCLOSED EMBODIMENTS

Figure 1:
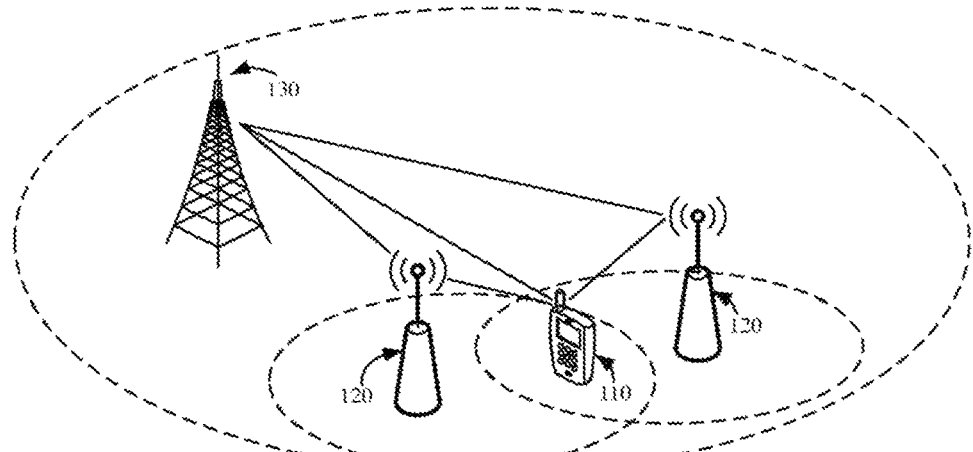
FIG. 1 is a schematic diagram of a wireless communication system according to an embodiment of the disclosure.

FIG. 1 is a schematic diagram of a system 100 according to an embodiment of the disclosure.

As shown in FIG. 1, a terminal device 110 is connected with a first network device 130 under a first communication system and a second network device 120 under a second communication system. For example, the first network device 130 is a network device under long term evolution (LTE), and the second network device 120 is a network device under new radio (NR).

The first network device 130 and the second network device 120 may include multiple cells.

It should be understood that FIG. 1 is an example of the communication system of the embodiment of the disclosure, and the embodiment of the disclosure is not limited to that shown in FIG. 1.

As an example, the communication system of the embodiment of the disclosure may include at least multiple network devices under the first communication system and/or multiple network devices under the second communication system.

For example, the system 100 shown in FIG. 1 may include a primary network device under the first communication system and at least one secondary network device under the second communication system. The at least one secondary network devices are respectively connected with the primary network device to form a multi-connection and are respectively connected to the terminal device 110 to provide services for the terminal device 110. Specifically, the terminal device 110 may establish connections through the primary network device and the secondary network device at the same time.

Optionally, a connection established between the terminal device 110 and the primary network device is a primary connection, and a connection established between the terminal device 110 and the secondary network device is a secondary connection. A control signaling of the terminal device 110 may be transmitted through the primary connection, and data of the terminal device 110 may be transmitted through the primary connection and the secondary connection at the same time or may be transmitted only through the secondary connection.

As another example, the first communication system and the second communication system in the embodiment of the disclosure are different, but the specific categories of the first communication system and the second communication system are not limited.

For example, the first communication system and the second communication system may be various communication systems, such as a global system of mobile communication (GSM) system, a code division multiple access (CDMA) system, a wideband code division multiple access (WCDMA) system, a general packet radio service (GPRS), a long term evolution (LTE) system, an LTE time division duplex (TDD), and a universal mobile telecommunication system (UMTS).

The primary network device and the secondary network device may be any access network device.

Optionally, in some embodiments, the access network device may be a base transceiver station (BTS) in a global system of mobile communication (GSM) system or a code division multiple access (CDMA), a base station (Node B, NB) in a wideband code division multiple access (WCDMA) system, or an evolutional base station (evolutional Node B, eNB or eNodeB) in a long term evolution (LTE) system.

Optionally, the access network device may also be a wireless controller in a next generation radio access network (NG RAN), a base station (gNB) in an NR system, or a cloud radio access network (CRAN), or the access network device may be a network device in a relay station, an access point, an in-vehicle device, a wearable device, a future evolution of a public land mobile network (PLMN), etc.

In the system 100 shown in FIG. 1, the first network device 130 being the primary network device and the second network device 120 being the secondary network device are taken as examples.

The first network device 130 may be an LTE network device, and the second network device 120 may be an NR network device. Alternatively, the first network device 130 may be an NR network device, and the second network device 120 may be an LTE network device. Alternatively, the first network device 130 and the second network device 120 may both be NR network devices. Alternatively, the first network device 130 may be a GSM network device, a CDMA network device, etc., and the second network device 120 may also be a GSM network device, a CDMA network device, etc. Alternatively, the first network device 130 may be a macro base station (macrocell), and the second network device 120 may be a microcell base station (microcell), a picocell base station (picocell), a femtocell base station (femtocell), etc.

Optionally, the terminal device 110 may be any terminal device, and the terminal device 110 includes but is not limited to the following.

Connection via a wired line, such as connection via public switched telephone networks (PSTN), a digital subscriber line (DSL), a digital cable, and a direct cable; another data connection/network; a wireless interface, for example, for a cellular network, a wireless local area network (WLAN), a digital television network such as a DVB-H network, a satellite network, and an AM-FM broadcast transmitter; an equipment of another terminal device that is set to receive/send communication signals; and/or an Internet of things (IoT) device. The terminal device set to communicate through a wireless interface may be referred to as a "wireless communication terminal", a "wireless terminal", or a "mobile terminal". Examples of the mobile terminal includes, but is not limited to, a satellite or cellular telephone; a personal communications system (PCS) terminal that may combine cellular radiotelephone and data processing, facsimile, and data communication capabilities; a PDA that may include a radiotelephone, a pager, an Internet/Intranet access, a Web browser, a memo pads, a calendar, and/or a global positioning system (GPS) receiver; and a conventional laptop and/or palm-sized receiver or other electronic equipment including a radiotelephone transceiver. The terminal device may refer to an access terminal, a user equipment (UE), a subscriber unit, a subscriber station, a mobile station, a mobile platform, a remote station, a remote terminal, a mobile device, a user terminal, a terminal, a wireless communication device, a user agent, or a user equipment. The access terminal may be a cellular telephone, a cordless phone, a session initiation protocol (SIP) telephone, a wireless local loop (WLL) station, a personal digital assistant (PDA), a handheld device with wireless communication function, a computing devices, other processing devices connected to wireless modems, an in-vehicle device, a wearable device, a terminal device in a 5G network, a terminal device in a future evolution of PLMN, etc.

It should be understood that the terms "system" and "network" are often used interchangeably herein.

With the development of technology, there are some services that have relatively high latency requirement, such as an ultra-reliable and low latency communications (URLLC) service or a time sensitive communication (TSC) service. The URLLC service and the TSC service are both services that have relatively high latency requirement.

The URLLC service is characterized by high reliability, low latency, extremely high availability, etc. Typical applications of the URLLC include industrial automation, power automation, telemedicine operation (surgery), unmanned driving, traffic safety assurance, etc.

The control of industrial automation needs to be tested for about 10 ms, and in terms of unmanned driving, the latency requirement is even higher, and the transmission latency needs to be as low as 1 ms.

The 5G intelligent interconnection of things (IIoT) is required to support the transmission of services such as factory automation, transport industry, and electrical power distribution in the 5G system. Based on the transmission requirements of latency and reliability, the IIoT introduces the concept of time sensitive networking (TSN) network or the TSC. In other words, the 5G network needs to be used to provide ultra-reliable and low latency transmission for the TSC service. For the TSC service, the most stringent latency requirement is 0.5 ms, and the reliability is 99.999999%.

In some special scenarios, the terminal device may communicate with multiple devices at the same time. In the process of communication between the terminal device and the devices, how to ensure the latency requirement of the URLLC service or the TSC service has become an urgent issue to be solved.

For example, the above scenario may be a handover scenario. Some systems allow the terminal device to maintain connection with a source base station in a handover procedure. In such case, the terminal device may transmit data with the source base station and a target base station at the same time. If the terminal device needs to send data to both a source cell and a target cell at the same time, but the terminal device can only transmit data with one base station at a time, then in such case, which data the terminal device chooses to transmit becomes an urgent issue to be solved. Alternatively, if available resources between the terminal device and the devices conflict, that is, the terminal device has multiple available resources at the same time, in such case, which available resource the terminal device chooses to transmit becomes an urgent issue to be solved.

The conventional handover procedure will be described below with reference to FIG. 2.

The handover procedure of the terminal device may be divided into the following three stages: handover preparation, handover execution, and handover completion.

The handover preparation may include measurement reporting a link quality by the terminal device, sending a handover request to the source base station, and receiving a handover command sent by the source base station.

The handover execution may include immediately executing the handover procedure by the terminal device after receiving the handover command sent by the source base station. For example, the connection with the source cell may be disconnected and the connection (for example, executing random access, sending a radio resource control (RRC) handover completion message to the target base station, etc.), serial number (SN) status transfer, data forwarding, etc. with the target cell may be completed.

The handover completion may include the target cell executing link handover with an access and mobility management function (AMF) and a user plane function (UPF), releasing UE context of the source base station, etc.

For the NR system, the link handover and the release of the UE context of the source base station may be executed by the AMF and the UPF. For the LTE system, the link handover and the release of the UE context of the source base station may be executed by a mobility management entity (MIME) to execute. The embodiment of the disclosure does not specifically limit the applied system, which may be the LTE system and may also be the NR system.

Figure 2:
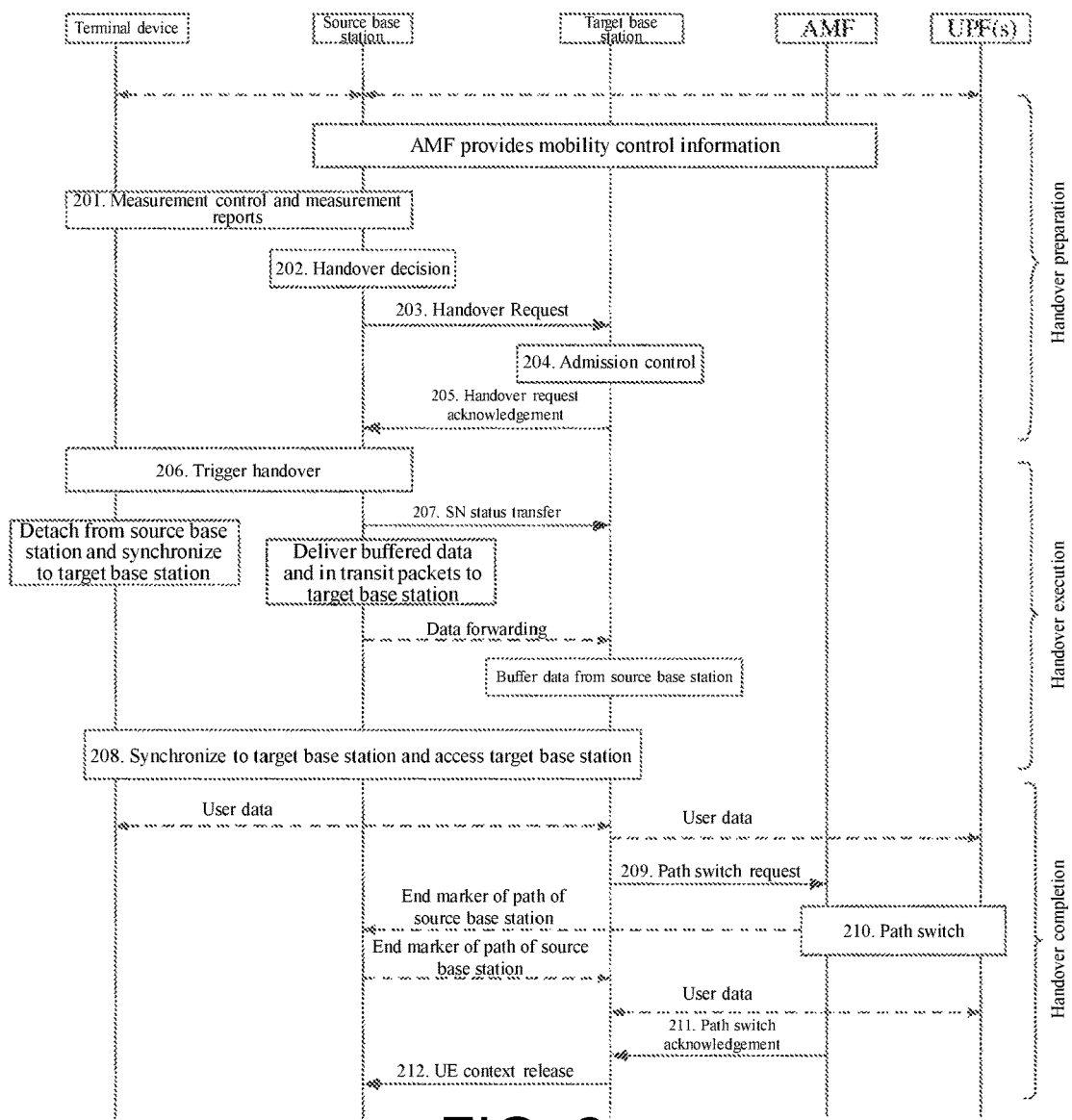
FIG. 2 is a schematic flowchart of a conventional method for cell handover.

Specifically, as shown in FIG. 2, the handover preparation stage (201 to 205) may include the following.

In 201, the source base station triggers the terminal device to perform neighbor cell measurement, so that the terminal device may measure a neighbor cell and report a measurement result to the source base station.

In 202, the source base station evaluates the measurement result reported by the terminal device, and decides whether to trigger handover.

In 203, if the source base station decides to trigger the handover, a handover request may be sent to the target base station.

In 204, after receiving the handover request sent by the source base station, the target base station may start admission control according to service information carried by the source base station, and perform wireless resource configuration.

In 205, the target base station sends a handover request acknowledgment message to the source base station, and returns an admission result and wireless resource configuration information in the target base station to the source base station. So far, the handover preparation stage is completed. If the target base station agrees to the handover request, an RRC message, such as mobility control information, which includes a random access channel (RACH) resource, a cell-radio network temporary identity (C-RNTI), a target base station security algorithm, a target base station system message, etc. is configured for the terminal device.

In the second stage, the handover execution stage (206 to 208) may include the following.

In 206, after receiving the handover request acknowledgment message from the target base station, the source base station may send a handover command to the terminal device. For example, the source base station may forward mobility control information to the terminal device.

In 207, the source base station may forward buffered data, a data packet in transmission, a system serial number of data, etc. to the target base station. Also, the target base station may buffer the data received from the source base station.

In addition, after receiving the handover command, the terminal device may disconnect the connection with the source base station, establish synchronization with the target base station, and establish a UE packet data convergence protocol (PDCP) entity.

At 208, the terminal device synchronizes to the target base station. So far, the handover execution stage is completed.

In the third stage, the handover completion stage (209 to 212) may include the following.

In 209, the target base station sends a path switch request to the access and mobility management function (AMF).

In 210, after receiving the path switch request from the target base station, the AMF executes path switch with the user plane function (UPF), and ends the marker of the path of the source base station on a user plane.

In 211, after the path switch is completed, the AMF may send a path switch acknowledgment message to the target base station.

In 212, the target base station sends a UE context release message to the source base station to notify the source base station that the handover is successful, and trigger the source base station to release a UE context. So far, the handover is completed.

The handover procedure described above requires the terminal device to disconnect the connection with the source base station, but with the development of technology, some new handover procedures have emerged, such as dual active protocol stack (DAPS) handover. During the handover procedure, after the terminal device receives the handover command, the terminal device continues to maintain the connection with the source base station, initiates random access to the target base station at the same time, and only releases the connection with the source base station after the terminal device completes access to the target base station. Correspondingly, in the handover procedure, the terminal device may maintain uninterrupted data transmission with the source base station.

For example, before the handover, the terminal device performs the data transmission with the source base station. After the handover, the terminal device transmits new data or unconfirmed data with the target base station, and retransmits data with the source base station at the same time until an instruction to release the connection with the source base station is received from the target base station, wherein the retransmitted data may be data transmitted by the terminal device with the source base station before the handover but failed to be transmitted.

In the DAPS handover procedure, how to ensure the transmission requirement of the URLLC service is not considered. In the DAPS handover procedure, if the terminal device does not support dual transmission or dual radio frequency chains, the terminal device can only perform data transmission with one base station (source base station or target base station) at a time, and the service corresponding to the other base station is discarded, ignored, or delayed. Since the support for the URLLC service is not considered, the service chosen for transmission by the terminal device or the network device may not be the URLLC service, which causes the quality of service (QoS) of the URLLC service to be unable to be guaranteed, resulting in the transmission failure of the URLLC service.

Therefore, in the handover scenario, how to support the transmission of the URLLC service to ensure the QoS performance of the URLLC service has become an urgent issue to be solved.

Typically, since the target of the DAPS is to support uninterrupted service transmission during handover, the support for the URLLC service may be considered based on the DAPS.

Figure 3:
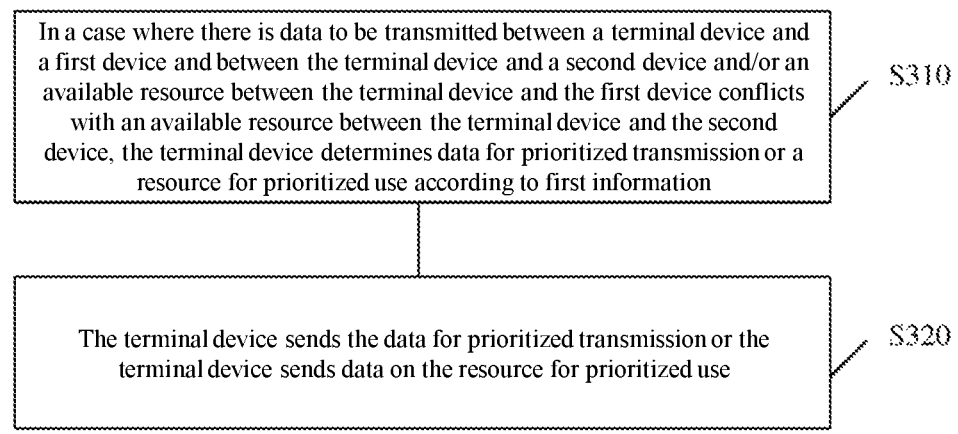
FIG. 3 is a schematic flowchart of a method for transmitting data according to an embodiment of the disclosure.

The embodiment of the disclosure provides a method for transmitting data, which is conducive to ensuring the transmission requirements of special services. As shown in FIG. 3, the method includes Steps S310 and S320.

In S310, in a case where there is data to be transmitted between a terminal device and a first device and between the terminal device and a second device and/or an available resource between the terminal device and the first device conflicts with an available resource between the terminal device and the second device, the terminal device determines data for prioritized transmission or a resource for prioritized use according to first information.

In S320, the terminal device sends the data for prioritized transmission or the terminal device sends data on the resource for prioritized use.

The embodiment of the disclosure does not specifically limit the first device and the second device. The first device and the second device may be a terminal device or a network device, as long as the terminal device can maintain communication with the first device and the second device at the same time.

As an example, the first device and the second device may be devices in a cell handover procedure. For example, the first device may be the source base station and the second device may be the target base station, or the first device may be the target base station and the second device may be the source base station.

As another example, the first device and the second device may be devices in a device to device (D2D) scenario. The first device and the second device may be other terminal devices that can communicate with the terminal device in the D2D scenario.

In the process of the terminal device maintaining communication with both the first device and the second device, at a certain timepoint, the terminal device needs to send data to the first device and the second device at the same time, such as sending retransmitted data to the source base station and sending newly transmitted data to the target base station. If the terminal device supports dual transmission or dual radio frequency chains, the terminal device may transmit data with multiple devices (for example, the source base station and the target base station) at a time. If the terminal device does not support the function of dual transmission or dual radio frequency transmission, the terminal device may choose data for prioritized transmission to send or choose data for prioritized transmission according to the first information to send, so as to ensure the transmission requirements of some special services.

As another case, the available resource between the terminal device and the first device conflicts with the available resource between the terminal device and the second device, that is, the available resources for the two devices overlap at least in time or the terminal device has the resources for both the first device and the second device at the same time. Assuming that at the same timepoint, the terminal device has two uplink resources, a resource 1 and a resource 2, and the terminal device needs to send data to the first device on the resource 1 and send data to the second device on the resource 2. At this time, the terminal device may choose the resource for prioritized use according to the first information, and send the corresponding data on the resource. For example, if the terminal device chooses the resource 1, the terminal device may use the resource 1 to send the data to the first device.

The embodiment of the disclosure does not specifically limit the amount of data to be transmitted. For example, there may be one or more data to be transmitted, such as data to be transmitted of at least one logical channel (LCH), between the terminal device and the first device terminal, and there may also be one or more data to be transmitted, such as data to be transmitted of at least one LCH, between the device and the second device.

In addition to choosing the data for prioritized transmission and the resource for prioritized use, other contents may also be chosen in the embodiment of the disclosure, as long as the data for prioritized transmission can be determined. For example, since the device and the data also have a certain correspondence, the terminal device may also choose the device for prioritized data transmission according to the first information, thereby sending corresponding data to the device.

The first information may be, for example, at least one of data to be transmitted, a service identifier, a service priority, a service type, a logical channel identifier, a logical channel priority, a resource priority, a service that can be transmitted on a specific resource, a logical channel that can be transmitted on a specific resource, a resource type, a priority transmission instruction, a DAPS handover identifier, and an identifier of a bearer configured with or supporting the DAPS function.

The data to be transmitted including first data and second data is exemplified for description below, and the first data is the data that needs to be sent to the first device, and the second data is the data that needs to be sent to the second device.

The first information may include, for example, the service identifier. The terminal device may choose data or a service for prioritized transmission according to different service identifiers. If the service identifier corresponding to the first data is the service identifier of the URLLC, and the service identifier corresponding to the second data is the service identifier of the enhanced mobile broadband (eMBB), the terminal device may determine that the data for prioritized transmission is the first data, and the terminal device may send the first data to the first device or use the resource corresponding to the first data for transmission.

Optionally, the service identifier may also be preconfigured in the terminal device or predefined in a protocol.

The network device may configure a list of service identifiers that need prioritized transmission and/or a list of service identifiers that do not need prioritized transmission to the terminal device. When there are two conflicting data that need to be transmitted, the terminal device may determine which data needs prioritized transmission and which data does not need prioritized transmission according to the lists. Optionally, the lists may also be preconfigured in the terminal device or predefined in the protocol.

The first information may include, for example, the service priority. The terminal device may choose the data or the service for prioritized transmission according to different service priorities.

For example, if the service priority corresponding to the first data is higher than the service priority corresponding to the second data, the terminal device may determine that the data for prioritized transmission is the first data, and the terminal device may send the first data to the first device or use the resource corresponding to the first data for transmission.

For another example, if the service priority corresponding to the first data is higher than a preset threshold, and the service priority corresponding to the second data is lower than the preset threshold, the terminal device may determine that the data for prioritized transmission is the first data, and the terminal device may send the first data to the first device or use the resource corresponding to the first data for transmission.

Optionally, the service identifier may also be preconfigured in the terminal device or predefined in the protocol.

The first information may include, for example, the service type. The terminal device may choose the data or the service for prioritized transmission according to different service types. The description of the service type is similar to the description of the service identifier, and some service types that need prioritized transmission and/or the service types that do not need prioritized transmission may also be predefined. If the service type corresponding to the first data is the URLLC, and the service type corresponding to the second data is the eMBB, the terminal device may determine that the data for prioritized transmission is the first data, and the terminal device may send the first data to the first device or use the resource corresponding to the first data for transmission.

The first information may include, for example, the logical channel identifier. The terminal device may choose the data or the logical channel for prioritized transmission according to different logical channel identifiers. In the manner, the terminal device may obtain in advance an identifier or a list of identifiers (a list 1) of the logical channels that need prioritized transmission and/or an identifier or a list of identifiers (a list 2) of the logical channels that do not need prioritized transmission. When there are the first data and the second data to be transmitted, the terminal device may determine which data needs prioritized transmission according to the identifiers of the logical channels for transmitting the first data and the second data or according to which list the logical channels for transmitting the first data and the second data respectively belong to. If the logical channel for transmitting the first data belongs to the list 1, and the logical channel for transmitting the second data belongs to the list 2, the terminal device determines that the data for prioritized transmission is the first data, and the terminal device may send the first data to the first device or use the resource corresponding to the first data for transmission.

The first information may include, for example, the logical channel priority. The terminal device may choose the data or the logical channel for prioritized transmission according to the logical channel priority.

For example, if the priority of the logical channel for transmitting the first data is higher than the priority of the logical channel for transmitting the second data, the terminal device may determine that the data for prioritized transmission is the first data, and the terminal device may send the first data to the first device or use the resource corresponding to the first data for transmission.

For another example, if the priority of the logical channel for transmitting the first data is higher than a preset threshold, and the priority of the logical channel for transmitting the second data is lower than the preset threshold, the terminal device may determine that the data for prioritized transmission is the first data, the terminal device may send the first data to the first device or use the resource corresponding to the first data for transmission.

The first information may include the resource priority. The terminal device may determine the data for prioritized transmission or the resource for prioritized use according to the resource priority.

For example, the resource for transmitting the first data is the resource 1, and the resource for transmitting the second data is the resource 2. If the priority of the resource 1 is higher than the priority of the resource 2, the terminal device may determine that the resource for prioritized use is the resource 1 or determine that the data for prioritized transmission is the data on the resource 1, and the terminal device may send the first data to the first device on the resource 1.

For another example, the resource for transmitting the first data is the resource 1, and the resource for transmitting the second data is the resource 2. If the priority of the resource 1 is higher than a preset threshold, and the priority of the resource 2 is lower than the preset threshold, the terminal device may determine that the resource for prioritized use is the resource 1 or determine that the data for prioritized transmission is the data on the resource 1, and the terminal device may send the first data to the first device on the resource 1.

The first information may include, for example, whether the service or the logical channel can be transmitted on a specific resource. In the embodiment of the disclosure, some special resources may be predefined, for example, some resources may be configured for the URLLC service. If the data to be transmitted belongs to a service or a logical channel that can multiplex the resource for transmission, the data to be transmitted is the data for prioritized transmission. If the data to be transmitted does not belong to the service or the logical channel that can multiplex the resource for transmission, the data to be transmitted is not the data for prioritized transmission.

The first information may include, for example, the resource type. The terminal device may determine the data for prioritized transmission or the resource for prioritized use according to different resource types. The terminal device may obtain in advance or predefine some special resource types in the terminal device, and the resource types indicate the resource types for prioritized use. If the data can be transmitted on the resources, the terminal device may determine that the data is the data for prioritized transmission.

The resource type may include, for example, at least one of a newly transmitted resource, a retransmitted resource, a preconfigured grant (CG) resource, a dynamic grant (DG) resource, and a resource corresponding to a target device, wherein the target device is the first device or the second device.

The terminal device may determine the data for prioritized transmission or the resource for prioritized use according to whether the resource is the newly transmitted resource or the retransmitted resource. In the embodiment of the disclosure, the use of the newly transmitted resource may be predefined as being prioritized or the use of the retransmitted resource may be predefined as being prioritized. Assuming that the predefinition is to prioritize the use of the newly transmitted resource, if the first data is the retransmitted data or the resource for transmitting the first data is the retransmitted resource, and the second data is the newly transmitted data or the resource for transmitting the second data is the newly transmitted resource, the terminal device may determine that the data for prioritized transmission is the second data, and the terminal device may send the second data to the second device or use the resource corresponding to the second data for transmission.

The terminal device may determine the data for prioritized transmission or the resource for prioritized use according to whether the resource is the preconfigured grant resource or the dynamic grant resource. In the embodiment of the disclosure, the resource for prioritized use may be predefined in the protocol, the resource for prioritized use may be configured by the network device to the terminal device, or the resource for prioritized use may be preconfigured in the terminal device. Assuming that the use of the DG resource is prioritized, if the first device configures the CG resource to the terminal device, and the second device configures the DG resource to the terminal device, the terminal device may determine that the data for prioritized transmission is the second data or determine that the resource for prioritized use is the DG resource scheduled by the second device.

The first information may include, for example, the priority transmission instruction. The terminal device may determine the data for prioritized transmission or the resource for prioritized use according to the priority transmission instruction.

As an example, the priority transmission instruction may be sent to the terminal device by the first device, the second device, or other devices. After receiving the priority transmission instruction, the terminal device may determine the data for prioritized transmission or the resource for prioritized use according to the priority transmission instruction. For example, if the priority transmission instruction instructs that the data for the first device is for prioritized transmission, the terminal device chooses to transmit the data for the first device. If the terminal device does not receive the priority transmission instruction, the terminal device may determine that the data for prioritized transmission is the data for the target device or the resource for prioritized use is the resource for the target device. The target device is the first device or the second device.

Of course, if the terminal device does not receive the priority transmission instruction, the terminal device may also determine the data for prioritized transmission or the resource for prioritized use according to other methods in the embodiments of the disclosure.

As another example, the priority transmission instruction may be preconfigured in the terminal device or the priority transmission instruction may be predefined in the protocol. The priority transmission instruction may be used to instruct that the data for prioritized transmission is the data for the target device or the resource for prioritized use is the resource for the target device, wherein the target device is the first device or the second device. For example, in the handover scenario, the target device may be the target base station, and the priority transmission instruction may be used to instruct to prioritize the transmission of the data for the target base station.

The priority transmission instruction may be instructed to the terminal device by the first device and/or the second device through at least one of bits, a bitmap, a cell identifier, a base station identifier, a resource identifier, a service identifier, and a bearer identifier.

For example, the priority transmission instruction may be instructed using individual bits or a bitmap. The bits and the bitmap may be bits and a bitmap for a time domain resource or bits and a bitmap under time division multiplexing (TDM). Assuming that 5 bits are adopted to indicate the priority transmission instruction, wherein each bit may be used to instruct the data for prioritized transmission or the resource for prioritized use in different time units. The time unit may be, for example, a symbol, a time slot, a sub time slot, a second, etc.

For example, assuming that the values of the 5 bits are 10110, and the time unit indicated by each bit is a time slot, the transmission of the data for the first device is prioritized in the 0-th, 2-nd, and 3-rd time slots, and the transmission of the data for the second device is prioritized in the 1-st and 4-th time slots.

The priority transmission instruction may be carried in a handover command, the handover command may be preconfigured in the terminal device, or the priority transmission instruction may be carried in an RRC message or a broadcast message different from the handover command. The RRC message may be a dedicated RRC message.

Assuming that the first device is the source base station and the second device is the target base station, the priority transmission instruction may be sent to the terminal device by the source base station or the target base station. If the terminal device receives the priority transmission instruction, the terminal device may perform data transmission according to the priority transmission instruction. If the terminal device does not receive the priority transmission instruction, the terminal device may determine the data for prioritized transmission according to other manners in the embodiments of the disclosure or if the terminal device does not receive the priority transmission instruction, the terminal device may prioritize the transmission of the data of the target base station by default.

The first information may include, for example, the DAPS handover identifier. The terminal device may determine the data for prioritized transmission or the resource for prioritized use according to the DAPS handover identifier. In the embodiment of the disclosure, the data for prioritized transmission or the resource for prioritized use may be implicitly instructed through the DAPS handover identifier.

For example, different DAPS handover identifiers may correspond to different devices, data, or resources. After receiving the DAPS handover identifier, the terminal device may determine that the data for prioritized transmission is the data for the device corresponding to the DAPS handover identifier or determine that the resource for prioritized use is the resource for the device corresponding to the DAPS handover identifier.

The correspondence between the DAPS handover identifier and the data, the device, or the resource may be sent to the terminal device by the network device, the first device, or the second device, may be preconfigured in the terminal device, or may be predefined in the protocol.

The first information may include, for example, the identifier of the bearer configured with or supporting the DAPS function. The terminal device may determine the data for prioritized transmission according to whether the data to be transmitted is data on the bearer configured with or supporting the DAPS function. If the data to be transmitted belongs to the data on the bearer supporting the DAPS function, the data is the data for prioritized transmission. If the data to be transmitted is the data on a bearer not supporting the DAPS function, the data is not the data for prioritized transmission.

For another example, the first information may include, for example, the identifier of the bearer configured with or supporting the DAPS function. The bearer identifier may be used to implicitly instruct that the transmission of the data for the target device is prioritized. The target device is the first device or the second device. For example, the bearer identifier may be used to instruct that the transmission of the data for the target base station is prioritized. After receiving the bearer identifier, the terminal device may determine the data for prioritized transmission according to whether the data to be transmitted is the data for the target base station. If the data to be transmitted belongs to the data of the target base station, the data is the data for prioritized transmission. If the data to be transmitted does not belong to the data of the target base station, the data is not the data for prioritized transmission.

In addition to the manners described above, the terminal device may determine the data for prioritized transmission or the resource for prioritized use according to the first information. For example, the terminal device may determine priority information of the data to be transmitted or the available resource according to the first information, and then determine the data for prioritized transmission or the resource for prioritized use according to the priority information of the data to be transmitted or the available resource.

It can be understood that the priority of the data to be transmitted for the first device is the priority of the data with the highest priority among all the data to be transmitted for the first device, and the priority of the data to be transmitted for the second device is the priority of the data with the highest priority among all the data to be transmitted for the second device. For example, the data to be transmitted by the terminal device for the first device includes data 1, data 2, and data 3, wherein the data 1 has the highest priority, and the priority of the data to be transmitted for the first device is the priority of the data 1.

It can be understood that the data to be transmitted in the embodiment of the disclosure may include an LCH and/or a media access control (MAC) control element (CE). Correspondingly, the priority of the data to be transmitted is the priority of the LCH and/or the MAC CE.

The resource priority may be the priority of the resource itself or the priority of the data with the highest priority among the data that can be transmitted on the resource.

As an example, the terminal device may determine that the data for prioritized transmission is the data with a priority higher than a first preset threshold according to the priority information of the data to be transmitted or the available resource, or the terminal device may determine that the resource for prioritized use is the resource with a priority higher a second preset threshold.

As another example, in a case where the priorities of the data to be transmitted or the available resources are different, the terminal device may determine that the data for prioritized transmission is the data with the highest priority among the data to be transmitted or determine that the resource for prioritized use is the resource with the highest priority among the available resources.

As still another example, in a case where the priorities of the data to be transmitted or the available resources are the same, the terminal device may determine that the data for prioritized transmission is at least one of the data on the dynamic grant resource, the retransmitted data, the data on the bearer configured with the DAPS function, the data for the target device, and the data with the highest second priority among the data to be transmitted, wherein the target device is the first device or the second device.

The priorities of the data to be transmitted being the same may mean that the priority of the data with the highest priority among the data to be transmitted for the first device is the same as the priority of the data with the highest priority among the data to be transmitted for the second device. Assuming that the data for the first device includes the data 1, the data 2, and the data 3, and the data for the second device includes data 4, data 5, and data 6, wherein the data 1 is the data with the highest priority among the data 1, the data 2, and the data 3, and the data 4 is the data with the highest priority among the data 4, the data 5, and the data 6, if the priorities of the data 1 and the data 4 are the same, it represents that the priorities of the data to be transmitted for the first device and the second device are the same.

The data with the highest second priority among the data to be transmitted may represent the data with the highest priority when comparing the data with the second priority among the data to be transmitted for the first device and the data with the second priority among the data to be transmitted for the second device. For example, assuming that the data 2 is the data with the second priority among the data 1, the data 2, and the data 3, and the data 5 is the data with the second priority among the data 4, the data 5, and the data 6, if the priorities of the data 1 and the data 4 are the same, the terminal device may further compare the priorities of the data 2 and the data 4, and use the data with the highest priority among the data 2 and the data 4 as the data for prioritized transmission. Further, the rest may be deduced by analogy.

Similarly, if the priorities of the available resources are the same, it represents that the priorities of the available resources themselves are the same or the priorities of the data with the highest priority among the data that can be transmitted on the available resources are the same, and the terminal device may further determine the resource for prioritized use according to the level of the priority of the data with the second priority among the data that can be transmitted on the available resources.

In the above description, the data for prioritized transmission may be the data of the ultra-reliable and low latency communications service or logical channel and/or the resource for prioritized use may be the resource of the ultra-reliable and low latency communications service or logical channel. Specifically, the data for prioritized transmission may be the data of the TSC service or the data of the URLLC service.

For the handover scenario, the terminal device may receive the handover command and retain configuration information in the handover command. In a case where the DAPS function is configured, the terminal device may execute DAPS handover. In the DAPS handover, when the terminal device has data to be transmitted or has available resources at the same time in both the source cell and the target cell, the terminal device may determine the priority of the data or the available resource or determine the service or resource for prioritized transmission according to the first information. Reference may be made to the above description for the specific process.

The following describes an example in conjunction with the handover scenario.

When the terminal device receives the priority transmission instruction, the terminal device may determine whether to prioritize the transmission of the data of the source cell or the data of the target cell according to the priority transmission instruction. Alternatively, when the terminal device does not receive any priority transmission instruction, the terminal device determines to prioritize the transmission of the data of the target cell.

When the terminal device has data to be transmitted or has available resources at the same time in both the source cell and the target cell, and the priorities of the data to be transmitted or the available resources are different, the terminal device chooses the data, the logical channel, or the resource with high priority or of the URLLC type for transmission.

When the terminal device has data to be transmitted or has available resources at the same time in both the source cell and the target cell, and the priorities of the data to be transmitted or the available resources are the same, the terminal device may prioritize the use of the resource of the target device, prioritize DG transmission, prioritize the retransmission, or prioritize the transmission of the bearer configured with the DAPS function.

For example, when the terminal device has data to be transmitted or has available resources at the same time in both the source cell and the target cell, the priority of a resource configuration for the source cell is low, and the priority of a resource configuration for the target cell is high, the terminal device may choose to transmit on the resource of the target cell.

For example, when the terminal device has data to be transmitted or has available resources at the same time in both the source cell and the target cell, the service or the logical channel to be transmitted corresponding to the resource of the source cell is the URLLC, and the service or the logical channel to be transmitted corresponding to the resource of the target cell is the eMBB, the terminal device may choose to transmit on the resource of the source cell.

For example, when the terminal device has data to be transmitted or has available resources at the same time in both the source cell and the target cell, the priority of the logical channel to be transmitted of the source cell is high or corresponds to the URLLC, and the priority of the logical channel to be transmitted of the target cell is low or corresponds to the eMBB, the terminal device may choose to transmit on the resource of the source cell.

For example, when the terminal device has data to be transmitted or has available resources at the same time in both the source cell and the target cell, and the priorities of the data to be transmitted and the available resources are the same, the terminal device may determine the resource for prioritized use according to the priority transmission instruction. Assuming that the priority transmission instruction instructs to prioritize the transmission of the data of the source cell, the terminal device may transmit data on the resource of the source cell.

For example, when the terminal device has data to be transmitted or has available resources at the same time in both the source cell and the target cell, and the priorities of the data to be transmitted or the available resources are the same, the terminal device prioritizes the transmission of the cell with the DG resource.

For example, when the terminal device has data to be transmitted or has available resources at the same time in both the source cell and the target cell, and the priorities of the data to be transmitted or the available resources are the same, the terminal device prioritizes the retransmission.

For example, the terminal device determines the resource for prioritized transmission according to the data to be transmitted and the priority transmission instruction. Specifically, when the terminal device has data to be transmitted and available resources for both the source cell and the target cell, and the terminal device has the priority transmission instruction, the terminal device may transmit according to the priority transmission instruction. When the terminal device has available resources for both the source cell and the target cell, but only has data to be transmitted for one cell, the terminal device may transmit according to the cell to which the data to be transmitted belongs. When the terminal device has available resources for both the source cell and the target cell, but only has data to be transmitted for one cell, and the terminal device has the priority transmission instruction, the terminal device may transmit according to the priority transmission instruction or according to the cell to which the data to be transmitted belongs.

In a case where the terminal device receives a source base station release instruction, the terminal device may disconnect the connection with the source base station and stop sending data to the source base station. For example, the terminal device releases a protocol stack corresponding to the source cell, terminates the data transmission with the source cell, and only maintains the data transmission with the target cell.

Based on the method provided by the embodiment of the disclosure, in the cell handover procedure, the terminal device may choose the service for prioritized transmission or the resource for prioritized use, so that in a case where there is the URLLC service, the transmission of the URLLC service can be prioritized, thereby ensuring the transmission requirement of the URLLC service in the handover procedure.

Figure 4:
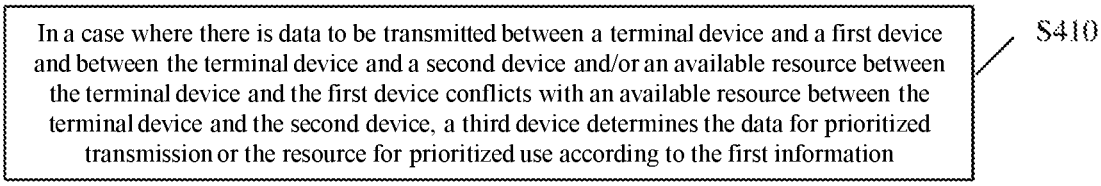
FIG. 4 is a schematic flowchart of another method for transmitting data according to an embodiment of the disclosure.

The above is to choose the data for prioritized transmission or the resource for prioritized use from the perspective of the terminal device. The embodiment of the disclosure also provides another method to choose the data for prioritized transmission or the resource for prioritized use from the perspective of other devices to ensure the transmission requirements of special services. As shown in FIG. 4, the method includes Step S410.

In S410, in a case where there is data to be transmitted between a terminal device and a first device and between the terminal device and a second device and/or an available resource between the terminal device and the first device conflicts with an available resource between the terminal device and the second device, a third device determines the data for prioritized transmission or the resource for prioritized use according to the first information.

The third device may be the first device or the second device. Certainly, the third device may also be a device different from the first device and the second device, which is not specifically limited in the embodiment of the disclosure.

For the cell handover scenario, the third device may be the source base station or the target base station. The first device may be the source base station and the second device is the target base station, or the first device may be the target base station and the second device is the source base station.

Assuming that the third device is the first device, the first device may obtain information of the data to be transmitted for the first device through the terminal device, but how the first device obtains the information of the data to be transmitted for the second device is not specifically limited in the embodiment of the disclosure.

For example, the first device may obtain the information of the data to be transmitted through the second device. When the terminal device has the data to be transmitted for the second device, the terminal device may send the service attribute/characteristic, type, period, size, and other information of the data to be transmitted to the second device, and the second device may forward the information to the first device.

For another example, the first device may obtain the information of the data to be transmitted through the terminal device. When the terminal device has the data to be transmitted for the second device, the terminal device may send the service attribute/characteristic, type, period, size, and other information of the data to be transmitted to both the first device and the second device.

For another example, the first device may obtain the information of the data to be transmitted through a core network or a TSC control node (for example, a center network control (CNC)). When the terminal device has the data for the second device, the core network may send the information of the data to the first device.

Similarly, the manner for the third device to obtain the available resource for another device may also be according to the manner described above.

In addition, the available resource on each device may be determined by each device itself, by coordination, or by a specific device.

After the third device obtains the data to be transmitted and/or the available resources for the first device and the second device, the data for prioritized transmission or the resource for prioritized use may be determined according to the first information.

The first information may include, for example, at least one of the data to be transmitted, the service identifier, the service priority, the service type, the logical channel identifier, the logical channel priority, the resource priority, whether the service can be transmitted on a specific resource, whether the logical channel can be transmitted on a specific resource, the resource type, the priority transmission instruction, the DAPS handover identifier, the identifier of the bearer configured with or supporting the DAPS function.

The resource type may include, for example, at least one of the newly transmitted resource, the retransmitted resource, the preconfigured grant resource, the dynamic grant resource, and the resource of the target device, wherein the target device may be the first device or the second device.

The manner for the third device to determine the data for prioritized transmission or the resource for prioritized use according to the first information is similar to the manner for the terminal side. Reference may be made to the above description for the content not described below.

After the third device determines the data for prioritized transmission or the resource for prioritized use, the priority transmission instruction may be sent to the terminal device. After receiving the priority transmission instruction, the terminal device may transmit data according to the content of the priority transmission instruction.

Determining the data for prioritized transmission or the resource for prioritized use by the third device can reduce the processing complexity of the terminal device.

In a case where only one of the first device and the second device has the CG resource, the third device may determine to schedule the DG transmission or whether to choose CG transmission.

Alternatively, in the case where only one of the first device and the second device has the CG resource, the third device may determine that the resource for prioritized use is the CG resource. In addition, the device without the CG resource is not configured with the CG resource or does not schedule the DG resource. Two cases are respectively described below. The first case is that the third device is the device with the CG resource, and the second case is that the third device is the device without the CG resource.

Assuming that the third device is the first device, and only the first device has the CG resource among the first device and the second device, the first device determines that the resource for prioritized use is the CG resource. Correspondingly, resources are not configured or scheduled on another device. In addition, after determining to prioritize the transmission of the data on own device, the first device may also send instruction information to the second device to instruct the second device not to configure the CG resource for the terminal device or to instruct the second device not to schedule the DG resource to the terminal device.

Assuming that the third device is the second device, and only the first device has the CG resource among the first device and the second device, the second device determines that the resource for prioritized use is the CG resource. In addition, after determining to prioritize the transmission of the data on the first device, the second device may no longer configure the CG resource to the terminal device or schedule the DG resource to the terminal device. Optionally, the second device may instruct the information to the first device.

If neither the first device nor the second device has the CG resource or both have the CG resource, the third device may prioritize the scheduling of the retransmission or the choice of any device to schedule the DG transmission.

In addition, the third device may also execute at least one of determining a timepoint for data transmission between the terminal device and the first device and/or the second device; determining a TDM pattern for data transmission between the terminal device and the first device and/or the second device; and determining a time-domain and/or frequency-domain resource location for data transmission between the terminal device and the first device and/or the second device according to the first information.

When the third device configures the above resource for the terminal device, the terminal device can be ensured to have only one device that has an available uplink resource at the same timepoint, that is, the time domain resources of different devices are staggered to avoid conflicts between resources of multiple devices. Also, the issue of conflicts between resources may not be considered, and the resource is configured for the terminal device according to the traditional method.

When the resource configured for the terminal device by the third device is conflicting or the timepoint of data transmission configured for the terminal device is conflicting, the data for prioritized transmission or the resource for prioritized use may be determined according to the method described above.

Optionally, the third device may schedule or configure a first uplink resource for the terminal device. The first uplink resource is a resource of the terminal device performing data transmission with the first device and/or the second device at a specific timepoint.

The specific timepoint may include at least one timepoint in the cell handover procedure.

It should be noted that the device having the CG resource described above means that there is a valid CG resource in the device. The valid CG resource may, for example, refer to an activated CG resource, which may include a type 1 and/or type 2 CG.

In the above, the third device may obtain the first information by itself or obtain the first information through another device. The following is described in conjunction with the handover scenario.

For the handover scenario, the target base station may also send a handover request response message to the source base station. The handover request response message may include at least one of a DAPS handover instruction, an identifier of a bearer configured with the DAPS function, and an identifier of a CG or a CG group. If the third device is the source base station, the source base station may determine the data for prioritized transmission or the resource for prioritized use according to the handover request response message. Alternatively, the source base station may also send the handover request response message to the terminal device, so that the terminal device may determine the data for prioritized transmission or the resource for prioritized use according to the handover request response message.

Of course, the target base station may also use other messages to notify the terminal device or the source base station. In addition to the handover request response message, the source base station may also obtain the first information through other messages or other means.

Correspondingly, the source base station may send a handover request message, which carries at least one of the DAPS handover instruction, the identifier of the bearer configured with the DAPS function, and the identifier of the CG or the CG group, to the target base station. If the third device is the target base station, the target base station may determine the data for prioritized transmission or the resource for prioritized use according to the handover request message. Alternatively, the target base station may also send the handover request message to the terminal device, so that the terminal device may determine the data for prioritized transmission or the resource for prioritized use according to the handover request message.

Of course, the source base station may also use other messages to notify the terminal device or the target base station. In addition to the handover request message, the target base station may also obtain the first information through other messages or other means.

The wireless communication method according to the embodiment of the disclosure is described in detail above. An equipment according to the embodiment of the disclosure will be described below with reference to FIG. 5 to FIG. 9. The technical features described in the embodiment of the method are applicable to the following embodiment of the equipment.

Figure 5:
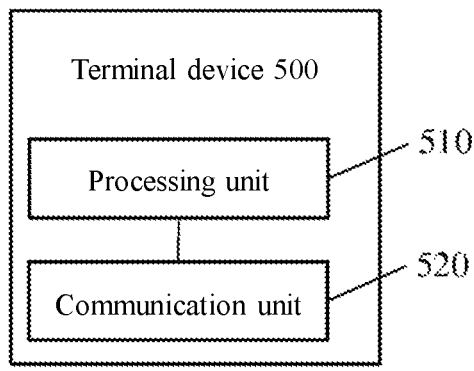
FIG. 5 is a schematic block diagram of a terminal device according to an embodiment of the disclosure.

FIG. 5 is a schematic block diagram of a terminal device according to an embodiment of the disclosure. The terminal device may be any terminal device described above. A terminal device 500 shown in FIG. 5 includes a processing unit 510 and a communication unit 520.

The processing unit 510 is used to determine data for prioritized transmission or a resource for prioritized use according to first information in a case where there is data to be transmitted between a terminal device 500 and a first device and between the terminal device 500 and a second device and/or an available resource between the terminal device 500 and the first device conflicts with an available resource between the terminal device and the second device.

The communication unit 520 is used to send the data for prioritized transmission or the terminal device 500 is used to send data on the resource for prioritized use.

Optionally, the first information includes at least one of a service identifier, a service priority, a service type, a logical channel identifier, a logical channel priority, a resource priority, whether the service can be transmitted on a specific resource, whether the logical channel can be transmitted on a specific resource, a resource type, a priority transmission instruction, a DAPS handover identifier, and an identifier of a bearer configured with or supporting a DAPS function.

Optionally, the resource type includes at least one of a newly transmitted resource, a retransmitted resource, a preconfigured grant resource, and a dynamic grant resource.

Optionally, the processing unit 510 is used to determine the data for prioritized transmission or the resource for prioritized use according to the priority transmission instruction.

Optionally, the processing unit 510 is used to determine that the data for prioritized transmission is data for a target device or determine that the resource for prioritized use is a resource for the target device in a case where the priority transmission instruction is not received, wherein the target device is the first device or the second device.

Optionally, the priority transmission instruction is instructed to the terminal device 500 by the first device and/or the second device through at least one of bits, a bitmap, a cell identifier, a base station identifier, a resource identifier, a service identifier, and a bearer identifier.

Optionally, at least one of an identifier of a bearer configured with DAPS handover, a preconfigured grant, and a priority transmission instruction included in the first information is carried in a handover command.

Optionally, the priority transmission instruction is carried in the handover command, the priority transmission instruction is preconfigured in the terminal device 500, or the priority transmission instruction is carried in wireless resource control signaling or a broadcast message.

Optionally, the processing unit 510 is used to determine priority information of the data to be transmitted or the available resource according to the first information; and determine that the data for prioritized transmission is data with a priority higher than a first preset threshold or determine that the resource for prioritized use is a resource with a priority higher than a second preset threshold according to the priority information of the data to be transmitted or the available resource.

Optionally, the processing unit 510 is used to determine priority information of the data to be transmitted or the available resource according to the first information; and determine that the data for prioritized transmission is data with the highest priority among the data to be transmitted or determine that the resource for prioritized use is a resource with the highest priority among the available resources in a case where priorities of the data to be transmitted or the available resources are different.

Optionally, the processing unit 510 is used to determine priority information of the data to be transmitted or the available resource according to the first information; and determine that the data for prioritized transmission is at least one of data on a dynamic grant resource, retransmitted data, data on the bearer configured with the DAPS function, data for the target device, and data with the highest second priority among the data to be transmitted in a case where priorities of the data to be transmitted or the available resources are the same, wherein the target device is the first device or the second device.

Optionally, the target device is the target base station.

Optionally, the first device is the source base station, and the second device is the target base station; or the first device is the target base station, and the second device is the source base station.

Optionally, the source base station and the target base station are devices in a handover procedure based on a dual active protocol stack.

Optionally, the processing unit 510 is used to stop sending data to the source base station in a case where a source base station release instruction is received.

Optionally, the data for prioritized transmission is the data of the ultra-reliable and low latency communications service or logical channel and/or the resource for prioritized use is the resource of the ultra-reliable and low latency communications service or logical channel.

Figure 6:
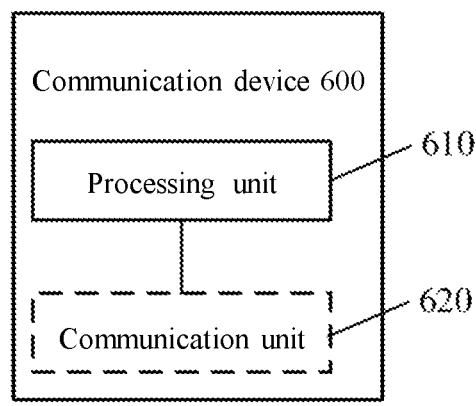
FIG. 6 is a schematic block diagram of a communication device according to an embodiment of the disclosure.

FIG. 6 is a schematic block diagram of a communication device according to an embodiment of the disclosure. The communication device may be any communication device described above. For example, the communication device may be the third device described above. A communication device 600 shown in FIG. 6 includes a processing unit 610.

The processing unit 610 determines data for prioritized transmission or a resource for prioritized use according to first information in a case where there is data to be transmitted between a terminal device and a first device and between the terminal device and a second device and/or an available resource between the terminal device and the first device conflicts with an available resource between the terminal device and the second device.

Optionally, the third device is the first device and/or the second device.

Optionally, the processing unit 610 is used to execute at least one of determining a timepoint for data transmission between the terminal device and the first device and/or the second device; determining a time division multiplexing pattern for data transmission between the terminal device and the first device and/or the second device; and determining a time-domain and/or frequency-domain resource location for data transmission between the terminal device and the first device and/or the second device according to the first information.

Optionally, the first information includes at least one of a service identifier, a service priority, a service type, a logical channel identifier, a logical channel priority, a resource priority, whether the service can be transmitted on a specific resource, whether the logical channel can be transmitted on a specific resource, a resource type, a priority transmission instruction, a DAPS handover identifier, and an identifier of a bearer configured with or supporting a DAPS function.

Optionally, the resource type includes at least one of a newly transmitted resource, a retransmitted resource, a preconfigured grant resource, and a dynamic grant resource.

Optionally, the processing unit 610 is used to determine priority information of the data to be transmitted or the available resource according to the first information; and determine that the data for prioritized transmission is data with a priority higher than a first preset threshold or determine that the resource for prioritized use is a resource with a priority higher than a second preset threshold according to the priority information of the data to be transmitted or the available resource.

Optionally, the processing unit 610 is used to determine priority information of the data to be transmitted or the available resource according to the first information; and determine that the data for prioritized transmission is data with the highest priority among the data to be transmitted or determine that the resource for prioritized use is a resource with the highest priority among the available resources in a case where priorities of the data to be transmitted or the available resources are different.

Optionally, the processing unit 610 is used to determine that the resource for prioritized use is the preconfigured grant resource in a case where only one of the first device and the second device has the preconfigured grant resource.

Optionally, a device without the preconfigured grant resource does not configure the preconfigured grant resource or does not schedule the dynamic grant resource.

Optionally, the processing unit 610 is used to determine that the data for prioritized transmission is retransmitted data, data for the target device, data with a priority higher than the first preset threshold, or data with the highest priority among the data to be transmitted; or determine that the resource for prioritized use is a retransmitted resource, a resource for the target device, a resource with a priority higher than the second preset threshold, or a resource with the highest priority among the available resources in a case where both the first device and the second device do not have or have the preconfigured grant resource, wherein the target device is the first device or the second device.

Optionally, the target device is the target base station.

Optionally, the processing unit 610 is used to schedule the terminal device to transmit the retransmitted data or schedule the terminal device to transmit data on the retransmitted resource.

Optionally, priorities of the data to be transmitted or the available resources are different.

Optionally, the third device further includes a communication unit 620. The communication unit 620 is used to send a priority transmission instruction to the terminal device. The priority transmission instruction is used to instruct the data for prioritized transmission or the resource for prioritized use.

Optionally, the priority transmission instruction is instructed through at least one of bits, a bitmap, a cell identifier, a base station identifier, a resource identifier, a service identifier, and a bearer identifier.

Optionally, the priority transmission instruction carries at least one of a handover command, wireless resource control signaling, and a broadcast message.

Optionally, the first device is the source base station, and the second device is the target base station; or the first device is the target base station, and the second device is the source base station.

Optionally, the third device is the target base station. The target base station includes the communication unit 620. The communication unit 620 is used to send a handover request response message to the source base station. The handover request response message includes at least one of a dual active protocol stack handover instruction, an identifier of a bearer configured with a dual active protocol stack function, and a resource of a preconfigured grant or grant group.

Optionally, the data for prioritized transmission is data of an ultra-reliable and low latency communications service or logical channel and/or the resource for prioritized use is a resource of an ultra-reliable and low latency communications service or logical channel.

Optionally, the processing unit 610 is used to schedule or configure a first uplink resource for the terminal device. The first uplink resource is a resource of the terminal device performing data transmission with the first device and/or the second device at a specific timepoint.

Optionally, the specific timepoint includes at least one timepoint in a cell handover procedure.

Optionally, in some embodiments, the communication unit 620 may be a communication interface or transceiver or an input/output interface of a communication chip or an on-chip system. The processing unit 610 may be one or more processors.

Figure 7:
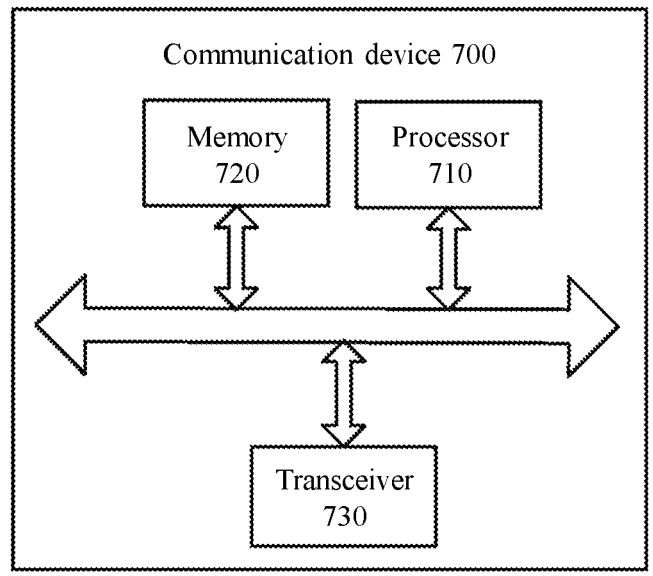
FIG. 7 is a schematic structural diagram of a communication device according to an embodiment of the disclosure.

FIG. 7 is a schematic structural diagram of a communication device 700 according to an embodiment of the disclosure. The communication device 700 shown in FIG. 7 includes a processor 710. The processor 710 may call and run a computer program from a memory to implement the method in the embodiment of the disclosure.

Optionally, as shown in FIG. 7, the communication device 700 may further include a memory 720. The processor 710 may call and run a computer program from the memory 720 to implement the method in the embodiment of the disclosure.

The memory 720 may be a separate apparatus independent of the processor 710 or may be integrated in the processor 710.

Optionally, as shown in FIG. 7, the communication device 700 may also include a transceiver 730. The processor 710 may control the transceiver 730 to communicate with other devices, specifically, to send information or data to other devices or to receive information or data sent by other devices.

The transceiver 730 may include a transmitter and a receiver. The transceiver 730 may further include an antenna. The number of the antenna may be one or more.

Optionally, the communication device 700 may, specifically, be the third device of the embodiment of the disclosure, and the communication device 700 may implement the corresponding processes implemented by the third device in each method of the embodiment of the disclosure. For the sake of brevity, details are not repeated here.

Optionally, the communication device 700 may, specifically, be the mobile terminal/terminal device of the embodiment of the disclosure, and the communication device 700 may implement the corresponding processes implemented by the mobile terminal/terminal device in each method of the embodiment of the disclosure. For the sake of brevity, details are not repeated here.

Figure 8:
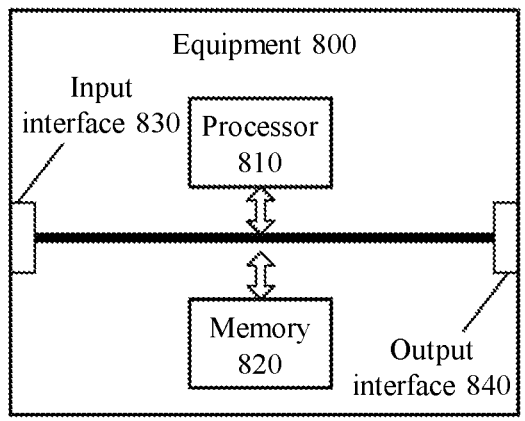
FIG. 8 is a schematic structural diagram of an equipment according to an embodiment of the disclosure.

FIG. 8 is a schematic structural diagram of an equipment according to an embodiment of the disclosure. An equipment 800 shown in FIG. 8 includes a processor 810. The processor 810 may call and run a computer program from a memory to implement the method in the embodiment of the disclosure.

Optionally, as shown in FIG. 8, the equipment 800 may further include a memory 820. The processor 810 may call and run a computer program from the memory 820 to implement the method in the embodiment of the disclosure.

The memory 820 may be a separate apparatus independent of the processor 810 or may be integrated in the processor 810.

Optionally, the equipment 800 may further include an input interface 830. The processor 810 may control the input interface 830 to communicate with other devices or equipment, specifically, to obtain information or data sent by other devices or equipment.

Optionally, the equipment 800 may further include an output interface 840. The processor 810 may control the output interface 840 to communicate with other devices or equipment, specifically, to output information or data to other devices or equipment.

Optionally, the equipment may be applied to the third device in the embodiment of the disclosure, and the third device may implement the corresponding processes implemented by the third device in each method of the embodiment of the disclosure. For the sake of brevity, details are not repeated here.

Optionally, the equipment may be applied to the mobile terminal/terminal device in the embodiment of the disclosure, and the equipment may implement the corresponding processes implemented by the mobile terminal/terminal device in each method of the embodiment of the disclosure. For the sake of brevity, details are not repeated here.

It should be understood that the equipment mentioned in the embodiment of the disclosure may be a chip. The chip may also be referred to as a system-level chip, a system chip, a chip system, an on-chip system chip, etc.

Figure 9:
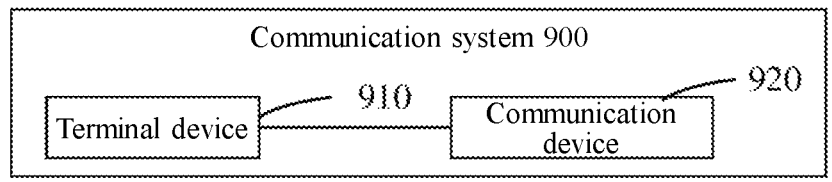
FIG. 9 is a schematic structural diagram of a communication system according to an embodiment of the disclosure.

FIG. 9 is a schematic block diagram of a communication system 900 according to an embodiment of the disclosure. As shown in FIG. 9, the communication system 900 includes a terminal device 910 and a communication device 920.

The terminal device 910 may be used to implement the corresponding function implemented by the terminal device in the above method, and the communication device 920 may be used to implement the corresponding function implemented by the communication device in the above method. For the sake of brevity, details are not repeated here.

It should be understood that the processor in the embodiment of the disclosure may be an integrated circuit chip with signal processing capability. In the implementation process, each step of the embodiment of the method may be completed by a hardware integrated logic circuit in the processor or a command in the form of software. The processor may be a general purpose processor, a digital signal processor (DSP), an application specific integrated circuit (ASIC), a field programmable gate array (FPGA), or other programmable logic apparatuses, discrete gate or transistor logic apparatuses, or discrete hardware components. Each method, step, and logical block diagram disclosed in the embodiment of the disclosure may be implemented or executed. The general purpose processor may be a microprocessor or the processor may also be any conventional processor, etc. The steps of the method disclosed in conjunction with the embodiment of the disclosure may be directly embodied as the completion of execution by a hardware decoding processor or the completion of execution by a combination of hardware and software modules in the decoding processor. The software module may be located in a random memory, a flash memory, a read-only memory, a programmable read-only memory, an electrically erasable programmable memory, a register, and other mature storage media in the field. The storage medium is located in the memory. The processor reads information in the memory to complete the steps of the method in conjunction with the hardware.

It can be understood that the memory in the embodiment of the disclosure may be a volatile memory or a non-volatile memory or may include both the volatile and non-volatile memories. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. Through exemplary but not restrictive description, many forms of RAMs may be used, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DRRAM). It should be noted that the memory of the system and the method described herein is intended to include, but is not limited to, the memories and any other suitable types of memories.

It should be understood that the description of the memory is exemplary but not limiting. For example, the memory in the embodiment of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a direct rambus RAM (DRRAM), etc. In other words, the memory in the embodiment of the disclosure is intended to include, but is not limited to, the memories and any other suitable types of memories.

The embodiment of the disclosure also provides a computer-readable storage medium for storing a computer program.

Optionally, the computer-readable storage medium may be applied to a network device in the embodiment of the disclosure, and the computer program enables a computer to execute the corresponding processes implemented by the network device in each method of the embodiment of the disclosure. For the sake of brevity, details are not repeated here.

Optionally, the computer-readable storage medium may be applied to a mobile terminal/terminal device in the embodiment of the disclosure, and the computer program enables a computer to execute the corresponding processes implemented by the mobile terminal/terminal device in each method of the embodiment of the disclosure. For the sake of brevity, details are not repeated here.

The embodiment of the disclosure also provides a computer program product, which includes a computer program command.

Optionally, the computer program product may be applied to a network device in the embodiment of the disclosure, and the computer program command enables a computer to execute the corresponding processes implemented by the network device in each method of the embodiment of the disclosure. For the sake of brevity, details are not repeated here.

Optionally, the computer program product may be applied to a mobile terminal/terminal device in the embodiment of the disclosure, and the computer program command enables a computer to execute the corresponding processes implemented by the mobile terminal/terminal device in each method of the embodiment of the disclosure. For the sake of brevity, details are not repeated here.

The embodiment of the disclosure also provides a computer program.

Optionally, the computer program may be applied to a network device in the embodiment of the disclosure. When the computer program is run on a computer, the computer executes the corresponding processes implemented by the network device in each method of the embodiment of the disclosure. For the sake of brevity, details are not repeated here.

Optionally, the computer program may be applied to a mobile terminal/terminal device in the embodiment of the disclosure, and when the computer program is run on a computer, the computer executes the corresponding processes implemented by the mobile terminal/terminal device in each method of the embodiment of the disclosure. For the sake of brevity, details are not repeated here.

Persons skilled in the art may be aware that the unit and the algorithm step of each example described in conjunction with the embodiment disclosed herein can be implemented by electronic hardware, or a combination of computer software and electronic hardware. Whether the functions are executed in the form hardware or software depends on the specific application and design constraints of the technical solution. Persons skilled in the art may implement the described function using different methods for each particular application, but such implementation should not be considered as exceeding the scope of the disclosure.

Persons skilled in the art may clearly understand that for the convenience and brevity of description, for the specific working process of the system, the equipment, and the unit described above, reference may be made to the corresponding process in the embodiment of the method, which will not be repeated here.

In the several embodiments provided in the disclosure, it should be understood that the disclosed system, equipment, and method may be implemented in other manners. For example, the embodiment of the equipment described above is only illustrative. For example, the division of units is only a logical function division, and in actual implementation, there may be other division manners. For example, multiple units or components may be combined or may be integrated into another system or some features may be ignored or not implemented. On the other hand, the shown or discussed mutual coupling, direct coupling, or communication connection may be through some interfaces, indirect coupling or communication connection between equipment or units, electrical, mechanical, or in other forms.

The units described as separate components may or may not be physically separated, and a component displayed as a unit may or may not be a physical unit, that is, may be located in one place or may be distributed to multiple network units. Some or all of the units may be chosen according to actual requirements to implement the objective of the solution in the embodiment.

In addition, each functional unit in each embodiment of the disclosure may be integrated into one processing unit, each unit may exist physically alone, or two or more units may be integrated into one unit.

The function, if implemented in the form of a software functional unit and sold or used as an independent product, may be stored in a computer-readable storage medium. For such understanding, the technical solution of the disclosure in essence, a part that contributes to the prior art, or a part of the technical solution may be embodied in the form of a software product. The computer software product is stored in a storage medium and includes several commands to enable a computer device (which may be a personal computer, a server, a network device, etc.) to execute all or part of the steps of the method described in each embodiment of the disclosure. The storage medium includes a U disk, a mobile hard disk, a read-only memory (ROM), a random access memory (RAM), a magnetic disk, an optical disk, or other media that may store program codes.

The above are only specific implementations of the disclosure, but the protection scope of the disclosure is not limited thereto. Any person skilled in the art may easily think of changes or substitutions within the technical scope disclosed in the disclosure, which should be covered within the protection scope of the disclosure. Therefore, the protection scope of the disclosure should be based on the protection scope of the claims.

What is claimed is:

1. A method for transmitting data, comprising:
in a case where there is data to be transmitted between a terminal device and a first device and between the terminal device and a second device and/or an available resource between the terminal device and the first device conflicts with an available resource between the terminal device and the second device, determining, by the terminal device, data for prioritized transmission or a resource for prioritized use according to first information, wherein the first information comprises a resource type, the resource type comprises a retransmitted resource, and determining the data for prioritized transmission or the resource for prioritized use according to the first information comprises:
obtaining in advance or predefining, by the terminal device, a plurality of resource types in the terminal device, wherein the plurality of resource types at least comprises the retransmission resource; and
if the data can be transmitted on resources of the retransmission resource, determining, by the terminal device, that the data is the data for prioritized transmission;
sending, by the terminal device, the data for prioritized transmission or sending, by the terminal device, data on the resource for prioritized use.

2. The method according to claim 1, wherein the first information further comprises at least one of a service identifier, a service priority, a service type, a logical channel identifier, a logical channel priority, a resource priority, whether a service can be transmitted on a specific resource, whether a logical channel can be transmitted on a specific resource, a priority transmission instruction, a dual active protocol stack (DAPS) handover identifier, and an identifier of a bearer configured with or supporting a DAPS function.

3. The method according to claim 2, wherein the first information comprises the priority transmission instruction, and determining, by the terminal device, the data for prioritized transmission or the resource for prioritized use according to the first information comprises:
determining, by the terminal device, the data for prioritized transmission or the resource for prioritized use according to the priority transmission instruction.

4. The method according to claim 2, wherein determining, by the terminal device, the data for prioritized transmission or the resource for prioritized use according to the first information comprises:
in a case where the terminal device does not receive the priority transmission instruction, determining that the data for prioritized transmission is data for a target device or determining that the resource for prioritized use is a resource for the target device, wherein the target device is the first device or the second device.

5. The method according to claim 2, wherein the priority transmission instruction is carried in a handover command, the priority transmission instruction is preconfigured in the terminal device, or the priority transmission instruction is carried in wireless resource control signaling or a broadcast message.

6. The method according to claim 1, wherein determining, by the terminal device, the data for prioritized transmission or the resource for prioritized use according to the first information comprises:
determining, by the terminal device, priority information of the data to be transmitted or the available resource according to the first information;
determining, by the terminal device, that the data for prioritized transmission is data with a priority higher than a first preset threshold or determining that the resource for prioritized use is a resource with a priority higher than a second preset threshold according to priority information of the data to be transmitted or the available resource.

7. The method according to claim 1, wherein determining, by the terminal device, the data for prioritized transmission or the resource for prioritized use according to the first information comprises:
determining, by the terminal device, priority information of the data to be transmitted or the available resource according to the first information;
in a case where priorities of the data to be transmitted or the available resources are different, determining, by the terminal device, that the data for prioritized transmission is data with a highest priority among the data to be transmitted or determining that the resource for prioritized use is a resource with a highest priority among the available resources.

8. The method according to claim 1, wherein determining, by the terminal device, the data for prioritized transmission or the resource for prioritized use according to the first information comprises:
determining, by the terminal device, priority information of the data to be transmitted or the available resource according to the first information;
in a case where priorities of the data to be transmitted or the available resources are same, determining, by the terminal device, that the data for prioritized transmission is at least one of data on a dynamic grant resource, retransmitted data, data on a bearer configured with a DAPS function, data for a target device, and data with a highest second priority among the data to be transmitted, wherein the target device is the first device or the second device.

9. The method according to claim 7, wherein the target device is a target base station.

10. The method according to claim 1, wherein the first device is a source base station and the second device is a target base station; or
the first device is the target base station and the second device is the source base station.

11. A method for transmitting data, comprising:
in a case where there is data to be transmitted between a terminal device and a first device and between the terminal device and a second device and/or an available resource between the terminal device and the first device conflicts with an available resource between the terminal device and the second device, determining, by a third device, data for prioritized transmission or a resource for prioritized use according to first information, wherein the first information comprises a resource type, the resource type comprises a retransmitted resource,
a plurality of resource types are obtained in advance or predefined in the terminal device, wherein the plurality of resource types at least comprises the retransmission resource;
if the data can be transmitted on resources of the retransmission resource, the data is the data for prioritized transmission.

12. The method according to claim 11, wherein the third device is the first device and/or the second device.

13. The method according to claim 11, wherein the first information further comprises at least one of a service identifier, a service priority, a service type, a logical channel identifier, a logical channel priority, a resource priority, whether a service can be transmitted on a specific resource, whether a logical channel can be transmitted on a specific resource, a priority transmission instruction, a dual active protocol stack (DAPS) handover identifier, and an identifier of a bearer configured with or supporting a DAPS function.

14. The method according to claim 11, wherein determining, by the third device, the data for prioritized transmission or the resource for prioritized use according to the first information comprises:
determining, by the third device, priority information of the data to be transmitted or the available resource according to the first information;
in a case where priorities of the data to be transmitted or the available resources are different, determining, by the third device, that the data for prioritized transmission is data with a highest priority among the data to be transmitted or determining that the resource for prioritized use is a resource with a highest priority among the available resources.

15. The method according to claim 11, wherein determining, by the third device, the data for prioritized transmission or the resource for prioritized use according to the first information comprises:
in a case where only one of the first device and the second device has a preconfigured grant resource, determining, by the third device, that the resource for prioritized use is the preconfigured grant resource.

16. The method according to claim 11, wherein determining, by the third device, the data for prioritized transmission or the resource for prioritized use according to the first information comprises:
in a case where both the first device and the second device do not have or have a preconfigured grant resource, determining, by the third device, that the data for prioritized transmission is retransmitted data, data for a target device, data with a priority higher than a first preset threshold, or data with a highest priority among the data to be transmitted; or
determining that the resource for prioritized use is the retransmitted resource, a resource for the target device, a resource with a priority higher than a second preset threshold, or a resource with a highest priority among the available resources, wherein
the target device is the first device or the second device.

17. The method according to claim 16, wherein the target device is a target base station.

18. The method according to claim 15, wherein priorities of the data to be transmitted or the available resources are different.

19. The method according to claim 11, wherein the first device is a source base station and the second device is a target base station; or
the first device is the target base station and the second device is the source base station.

20. A terminal device, comprising:
a processor, used to determine data for prioritized transmission or a resource for prioritized use according to first information in a case where there is data to be transmitted between a terminal device and a first device and between the terminal device and a second device and/or an available resource between the terminal device and the first device conflicts with an available resource between the terminal device and the second device, wherein the first information comprises a resource type, the resource type comprises a retransmitted resource, and the processor is further used to:
obtain in advance or predefining a plurality of resource types in the terminal device, wherein the plurality of resource types at least comprises the retransmission resource; and
if the data can be transmitted on resources of the retransmission resource, determine that the data is the data for prioritized transmission;
a communication transceiver, used to send the data for prioritized transmission or the terminal device sending data on the resource for prioritized use.

* * * * *